(12) United States Patent
Bouzige

(10) Patent No.: US 11,883,336 B2
(45) Date of Patent: Jan. 30, 2024

(54) VEHICLE

(71) Applicant: TOYOTA JIDOSHA KABUSHIKI KAISHA, Toyota (JP)

(72) Inventor: Laurent Bouzige, Biot (FR)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 410 days.

(21) Appl. No.: 17/288,980

(22) PCT Filed: Oct. 30, 2018

(86) PCT No.: PCT/IB2018/001434
§ 371 (c)(1),
(2) Date: Apr. 27, 2021

(87) PCT Pub. No.: WO2020/089669
PCT Pub. Date: May 7, 2020

(65) Prior Publication Data
US 2021/0378890 A1    Dec. 9, 2021

(51) Int. Cl.
*B60J 5/04*        (2006.01)
*B60N 2/90*        (2018.01)
(Continued)

(52) U.S. Cl.
CPC ............ *A61G 3/062* (2013.01); *B60J 5/0479* (2013.01); *B60N 2/14* (2013.01); *B60N 2/245* (2013.01);
(Continued)

(58) Field of Classification Search
CPC ...... B60N 2/245; B60N 2/2056; B60N 2/503; B60N 2/20; B60N 2/206; B60N 2/995;
(Continued)

(56) References Cited

U.S. PATENT DOCUMENTS 3,037,639 A    6/1962    Kost
4,226,462 A    10/1980   Wellett
(Continued)

FOREIGN PATENT DOCUMENTS

| DE | 10 2017 114 231 A1 | 1/2018 |
|---|---|---|
| EP | 3 132 969 A1 | 2/2017 |
| JP | 2000-140027 A | 5/2000 |

OTHER PUBLICATIONS

International Search Report dated Jul. 24, 2019 in PCT/IB2018/001434 filed Oct. 30, 2018.

*Primary Examiner* — Gregory A Blankenship
(74) *Attorney, Agent, or Firm* — Oblon, McClelland, Maier & Neustadt, L.L.P.

(57) ABSTRACT

Vehicle (100) having a body (1), the body comprising a door (2R) movable between a closed position and an open position. A piece of equipment (3R, 90R) is mounted at an inner side of the door in such a manner that when the door opens, said piece of equipment moves to take up an open position in which at least part of said piece of equipment is outside the body of the vehicle (100). The piece of equipment (3R, 90R) may comprise a seat cushion (36), a plurality of (Continued)

shelves, or a box. The vehicle further comprises a equipment positioning mechanism (60) capable of moving said piece of equipment relative to the door (2R).

8 Claims, 5 Drawing Sheets

(51) Int. Cl.
  *B60N 2/14*  (2006.01)
  *B60N 2/24*  (2006.01)
  *A61G 3/06*  (2006.01)
  *B60N 3/06*  (2006.01)
  *B60N 2/02*  (2006.01)
(52) U.S. Cl.
  CPC .............. *B60N 2/995* (2018.02); *B60N 3/06* (2013.01); *B60N 2/0256* (2023.08)
(58) Field of Classification Search
  CPC . B60N 2/14; B60N 3/06; A61G 3/062; A61G 3/001; B60J 5/0479
  See application file for complete search history.

(56) References Cited

U.S. PATENT DOCUMENTS

| | | | | |
|---|---|---|---|---|
| 4,479,753 | A | * | 10/1984 | Thorley .................. A61G 3/062 414/921 |
| 4,566,842 | A | * | 1/1986 | Clarke .................. A61G 3/0209 414/541 |
| 5,466,111 | A | * | 11/1995 | Meyer .................... B60N 2/245 414/800 |
| 5,540,539 | A | * | 7/1996 | Wolfman ............... A61G 3/062 414/921 |
| 9,463,121 | B1 | | 10/2016 | Maeshiro et al. |
| 11,491,919 | B2 | * | 11/2022 | Westfall .................... B60R 7/08 |
| 2003/0127837 | A1 | * | 7/2003 | Rajasingham ....... B60N 2/4214 280/730.1 |
| 2011/0070057 | A1 | * | 3/2011 | Kitchin .................. A61G 3/062 414/544 |
| 2016/0074261 | A1 | * | 3/2016 | Schoenian ............. A61G 3/062 414/462 |
| 2017/0050539 | A1 | | 2/2017 | Akimoto |
| 2018/0186294 | A1 | | 7/2018 | Koo et al. |
| 2018/0251042 | A1 | | 9/2018 | Baccouche et al. |
| 2021/0378890 | A1 | * | 12/2021 | Bouzige .................. B60N 2/14 |
| 2021/0380023 | A1 | * | 12/2021 | Kanitz ................... B60N 2/933 |
| 2022/0063458 | A1 | * | 3/2022 | Lee ...................... B60N 2/3045 |

\* cited by examiner

VEHICLE

FIELD OF THE DISCLOSURE

The present invention relates to vehicles, in particular passenger vehicles, but also vehicles designed to carry goods.

BACKGROUND OF THE DISCLOSURE

Despite the relatively quick ageing of the world population, the design of passenger vehicles has remained mostly unchanged, with the two row, sedan-type vehicle forming a major part of vehicle sales.

However, for older persons, getting seated in a car, and getting out of the car may not be very easy due to diminished physical condition.

Similarly, in the field of goods transportation the design of trucks, delivery vans has often remained fairly conventional: a worker or an operator who has to load/unload a good (a parcel) in or out of a truck has to place the good in the final position inside the truck, and thereafter to grab the good in this very position inside the truck for carrying the good out of the truck. Accordingly, loading and unloading goods in and out of a truck remains time-consuming and often tiring for the person in charge.

Accordingly, the design of passenger vehicles and of goods transportation vehicles can still be improved so as to propose vehicles in which people can easily get in or out, or in which goods can easily be placed or from which they can be easily retrieved.

SUMMARY OF THE DISCLOSURE

According to the invention, in order to meet the above need, a vehicle with improved ergonomics is proposed. This vehicle has a body which comprises a door movable between a closed position and an open position;

a piece of equipment is mounted at an inner side of the door in such a manner that when the door opens, said piece of equipment moves to take up an open position in which at least part of said piece of equipment is outside the body of the vehicle;

said piece of equipment comprises one of a seat cushion, a plurality of shelves, and a box; and the vehicle further comprises an equipment positioning mechanism capable of moving said piece of equipment relative to the door.

In this vehicle, the improved ergonomics of course depends on the type of equipment mounted in the vehicle.

The seat cushion mentioned above is a part of seat designed for a person to sit thereon. Typically, the piece of equipment is a lower seat portion, which includes the seat cushion.

When the piece of equipment comprises such a seat cushion, the vehicle is designed to make it easier to get in or out of the vehicle. Indeed, when the seat cushion is moved to the open position, it is placed in a position in which it is relatively easy to sit down on the seat, or conversely to get up from the seat. Therefore, the vehicle is adapted for elder people or for people for whom sitting down in a chair, or getting up from a chair is difficult.

The seat may preferably face a front or a rear direction of the vehicle (when the door is closed). In this case, the seat cushion is fastened to the door by a lateral side of the seat.

Similarly, when the piece of equipment is a box (or possibly two or more boxes) or a plurality of shelves, the vehicle is designed to facilitate loading and unloading of a good, e.g. a parcel, in the vehicle. In that case, in the open position, the shelves or the box is or are at least partly outside the body of the vehicle; in addition, the shelves or the box is or are moved relative to the door by the equipment positioning mechanism, and therefore take(s) up an open position relative to the door, which is different from the position it/they have when the door is closed. This open position of the shelves, or of the box, is chosen, depending on the specific arrangement of the vehicle, to make it easier to place a good on a shelf or in the box, compared with if the shelves or box were rigidly fastened to the door.

In the above definition, the word 'door' means broadly any panel which, in the closed position, closes at least part of an opening formed in the body of the vehicle. Accordingly the word 'door' is not limited to a side door of a vehicle, but can be any movable panel arranged in the body of the vehicle, such as a hood, boot lid, etc. of the vehicle. It can also be a panel specially arranged in the vehicle body to receive the piece of equipment.

In an embodiment, the equipment positioning mechanism is configured to move said piece of equipment downward and/or upward relative to the door. Thanks to this movement, in the open position, the piece of equipment can be positioned at the height relative to the ground at which it can be used most easily. In particular, in the case of a downward movement, the equipment positioning mechanism may be configured to move to move the piece of equipment downward until it is near the ground or in contact with the ground.

In an embodiment, the equipment positioning mechanism is configured to move said piece of equipment relative to the door before and/or during and/or after an opening movement of said door which opens said opening.

In an embodiment, when the door is in the closed position, said piece of equipment rests at least partially on the body or a support fastened to the body. In an alternative embodiment, when the door is in the closed position, said piece of equipment is only supported by the door.

In embodiments in which the piece of equipment includes a seat (a seat cushion), the piece of equipment may further comprise other elements: a footrest, armrest(s), and/or more generally any other elements suitable for a vehicle passenger seat.

For instance, the piece of equipment may further comprise a leg protection plate, arranged so that legs of a passenger seated in the chair are placed between the door and the leg protection plate.

Preferably, part of or all these elements are fixed on the inner side of the door.

In an embodiment, the vehicle further comprises a vital signs monitoring system, configured to acquire vital signs of a passenger seated on the seat.

In an embodiment, said piece of equipment is configured to be separated from the door once the door has reached the open position. For instance, said piece of equipment may be a wheelchair.

In addition, to prevent any harm from happening when the door is opened, the vehicle may further comprise a posture detection system, capable of detecting a body position of passenger(s) of the vehicle, and to prohibit opening of the door if it is detected that a position of said passenger(s) prevents safe opening of the door.

The posture detection system may include pressure sensors in the seat and/or the footrest. It can also include a camera configured to film the passenger(s) seated on the seat(s) of the vehicle.

The vehicle may further comprise a passenger health monitoring system. In that case, if the passenger feels unwell or has any health issue during a trip, so that it becomes necessary to contact a doctor or even to reach a hospital, it is possible to send the basic information (pulse, temperature, etc.) to the doctor or to the hospital without delay.

The door can be configured to be moved only manually, or it can be motorized, the vehicle then comprising one or more motors to open and close the door.

BRIEF DESCRIPTION OF THE DRAWINGS

The present invention may be better understood and its numerous other objects and advantages will become apparent to those skilled in the art by reference to the accompanying drawing wherein like reference numerals refer to like elements in the following figures and in which.

DESCRIPTION OF THE EMBODIMENTS

Three exemplary embodiments of the present disclosure, constituted by three fully autonomous shuttles 100, 200, 300, will now be described in relation respectively with FIGS. 1-3, FIG. 4 and FIG. 5.

Shuttles 100, 200 and 300 are mostly identical to each other, except essentially the pieces of equipment mounted on their rear doors. For this reason, the equipment positioning of these different shuttles are also slightly different from each other.

The elements of these different shuttles which are identical or almost identical bear the same reference sign.

Shuttle 100 is a vehicle configured to transport four passengers on the road.

Shuttle 100 has an autonomous driving system which can drive the shuttle in all circumstances within a predetermined operational design domain.

Shuttle 100 has a body 1, which is symmetric with respect to the median plane of the shuttle (extending along axis X and Z). For this reason, only the right side of the shuttle will be described.

On its right side, the body 1 is formed with a pair of passenger doors 2F,2R, These doors are arranged in a vis-à-vis position (opposite or facing each other), and each one of them is movable between a closed position and an open position. This arrangement makes it possible, in the open position of doors 2F,2R, to have a very large and very convenient opening in the body 10, to facilitate ingress and egress in and out of the shuttle.

Figure 1:
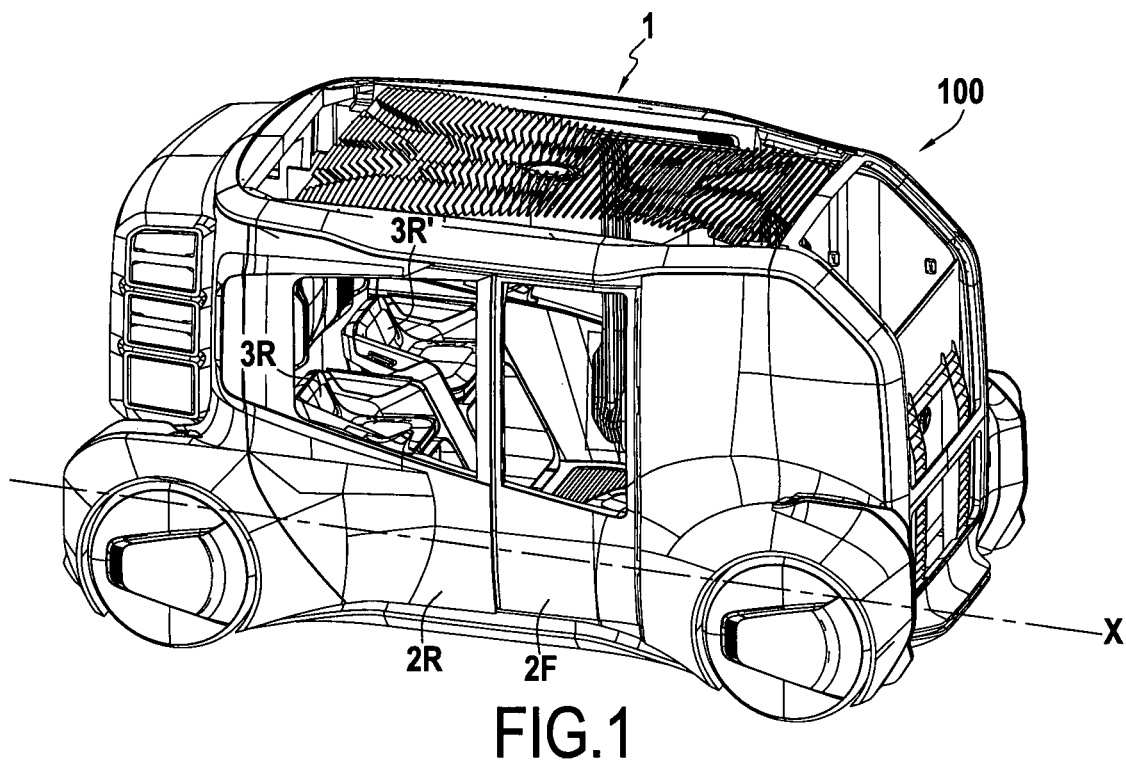
FIG. 1 is a schematic drawing in perspective of a first vehicle according to the present disclosure, with the doors closed.
Figure 2:
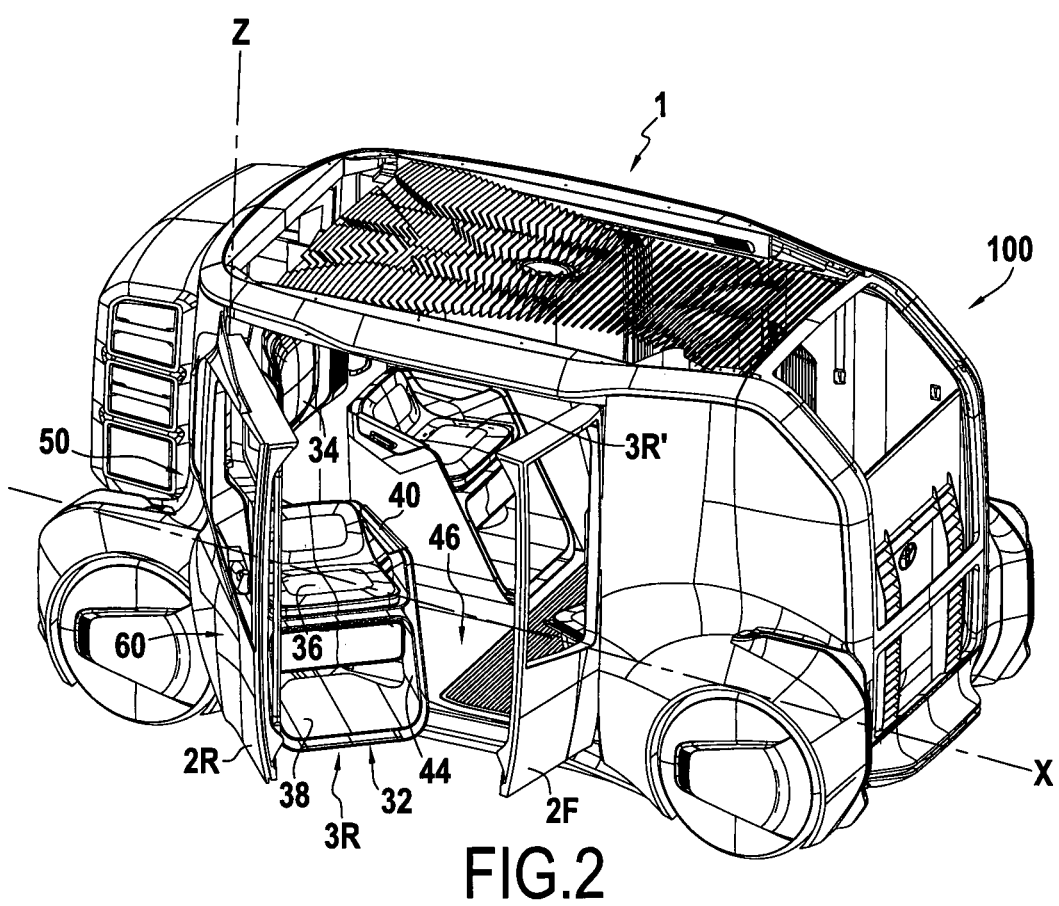
FIG. 2 is a schematic drawing in perspective of the first vehicle, with the doors partly open.
Figure 3:
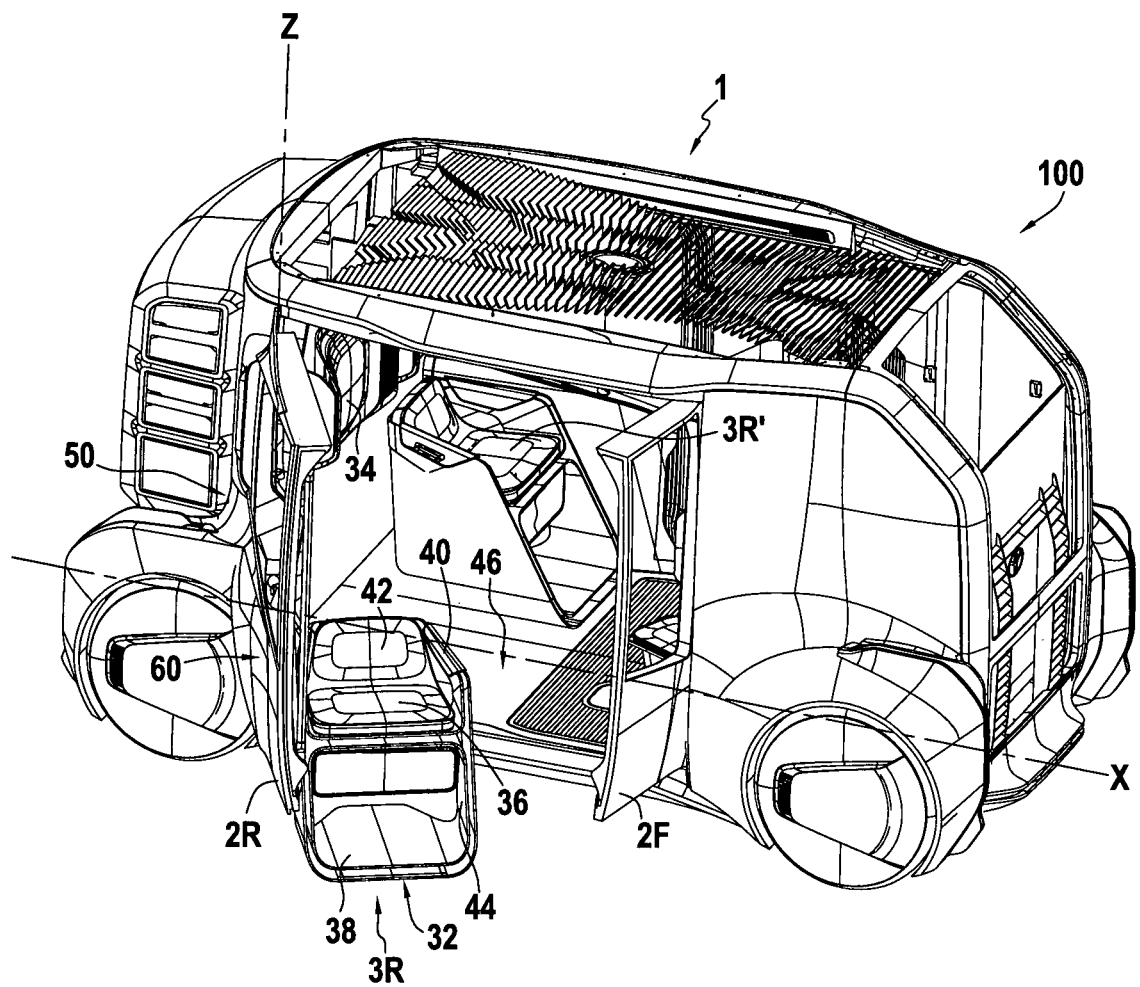
FIG. 3 is a schematic drawing in perspective of the first vehicle, with the doors open, a seat mounted on the right rear door being lowered.

The progressive opening of doors 2F,2R is illustrated by FIGS. 1 to 3.

The doors 2R,2F are moved from the closed position to the open position, and vice-versa by a door opening mechanism 50. The door opening mechanism 50 comprises a cylinder 52, whose output shaft 54 is connected to door 2R so as to move it between its open and closed position. The movements of the cylinder 52 are controlled by a data processing unit 4.

Shuttle 100 is equipped with four passenger seats 3F,3R, 3F',3R' (seats 3F',3R' are on the left side).

The seat 3R is formed in two parts. It includes a lower seat portion 32, and a higher seat portion 34.

In the present embodiment, the higher seat portion 34 is a back-rest which is fixed permanently on the inside rear wall of the body 1 of shuttle 100, on the right-hand side. In another embodiment, the higher seat portion 34 could be fastened to door 2R, and consequently would move with door 2R when it opens.

The lower seat portion 32 comprises different elements: a seat or seat cushion 36, a foot-rest 38, an arm-rest 40, a lower back-rest 42, and a leg protection plate 44.

The seat cushion 36 is the seat on which a passenger is to be seated. When the passenger sits in seat 3R, he or she may rest his feet on foot-rest 38, his back on the lower back-rest 42 (and on the main back-rest 34), his left arm on arm-rest 44, his right-arm on a (not-shown) right arm rest.

The leg protection plate 44 is arranged so that the legs of the passenger seated in seat 3R are placed between door 2R and the leg protection plate 44. For this reason, when the door 2R opens, the leg protection plate 44 moves with the door, and keeps protecting the legs of the passenger seated in seat 3R during this movement.

All these elements (36,38,40,42,44) are assembled rigidly to form the lower seat portion 32 (as an example of a 'piece of equipment'), which is mounted on the inner side of door 2R.

The lower seat portion 32 however is not fixedly mounted on door 2R. Indeed, the lower seat portion 32 is mounted on door 2R so that it can slide up and down relative to door 2R thanks to a seat positioning mechanism 60 (an example of an equipment positioning mechanism).

The seat positioning mechanism 60 comprises two substantially parallel racks 62, 64 parallel to each other, and an electric motor 66 arranged inside door 2R. The electric motor 66 is controlled by the data processing unit 4.

The seat positioning mechanism 60 is configured to move the lower seat portion 32 up and down relative to door 2R. In this purpose, the racks 62,64 are configured to slide substantially along the vertical direction. The motor 66 has output pinions 68,69, whose teeth are engaged with racks 62,64. Racks 62,64 are thus driven up and down when the pinions 68,69 rotate. The lower seat portion 32 is mounted on racks 62,64. Therefore, when the motor is operated and causes the pinions 68,69 to rotate, the rotation of the pinions causes the lower seat portion 32 to move downward and/or upward relative to the door 2R, as the case may be.

Shuttle 100 may further comprise a (not shown) vital signs monitoring system, configured to acquire vital signs of the passengers seated on seats 3R,3F,3R:3F'.

Shuttle 100 further comprises a posture detection system 80. This system comprises a fisheye camera 82, mounted on the roof lining of the shuttle. Camera 82 is configured to acquire images of the passengers seated on seats 3R,3F,3R', 3F'. It transmits the acquired images to the data processing unit 4. Data processing unit 4 processes the images and detects the positions of the passenger(s) of shuttle 100.

When a control to open any one of the doors of the shuttle is issued, data processing unit 4 executes a program to determine whether the position(s) of the passenger(s) might prevent safe opening of the door. In this latter case, a warning is sent to the passengers of the shuttle, and the opening of the door is stopped until data processing unit 4 determines that the position(s) of the passenger(s) no longer prevent safe opening of the door.

Getting In and Out of Shuttle 100

With shuttle 100 being configured as described above, a passenger who is sitting on seat 3R of the shuttle can get out of the shuttle as follows (FIGS. 1-3).

The passenger initially is sitting on seat 3R.

Figure 6:
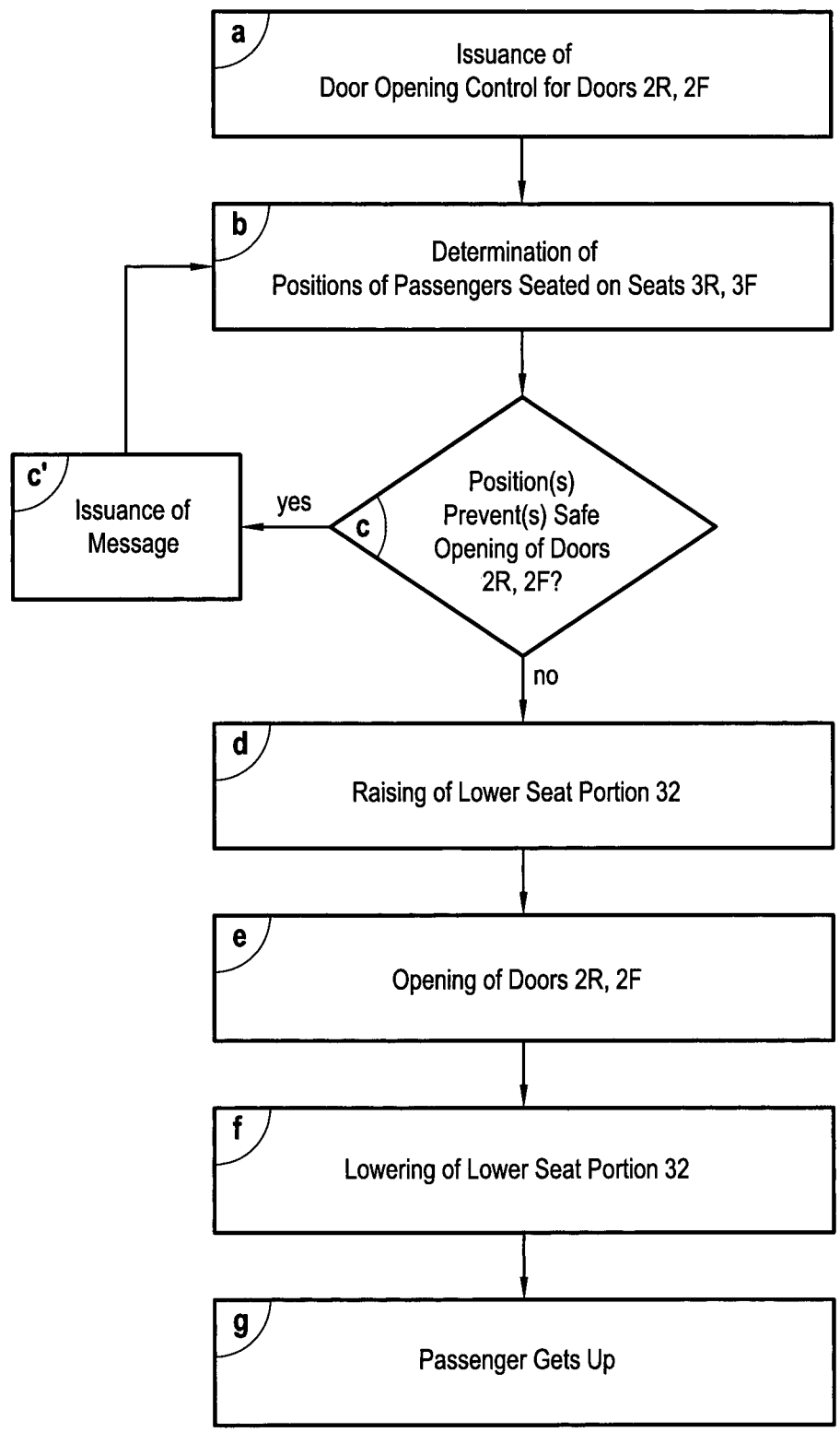
FIG. 6 is a block diagram, showing the steps for getting in the first vehicle.

When the shuttle 100 has reached a desired destination and the doors 2R,2F have to open, either automatically or for instance triggered by the passenger, at step a) a door opening control for doors 2R,2F is issued. Consequently, a position check request for doors 2R and 2F is sent to the posture detection system 80 (See FIG. 6).

Upon receiving the position check request, the posture detection system 80 acquires images of the passengers seated on seats 3R and 3F. The acquired images are processed by data processing unit 4, and the positions of the passenger(s) seated on seats 3R,3F of the shuttle are determined (step b).

If the posture detection system 80 determines that the position of any one of these passenger(s) might prevent safe opening of one of doors 2R,2F of the shuttle, a warning is sent to the passengers of the shuttle (step c'), and the procedure is resumed at step b).

Conversely, if the posture detection system 80 determines that the position(s) of the passenger(s) do(es) not prevent safe opening of doors 2R,2F, a seat raising control is sent to the seat positioning mechanism 60.

Upon receiving the seat raising control, the seat positioning mechanism 60 slightly lifts the lower seat portion 32 (step d). This movement places lower seat portion 32 (including its foot-rest 38) at some distance above the floor 46 of body 1, and thereby permits outward rotation of the lower seat portion 32 relative to body 1.

The seat positioning mechanism 60 further sends a door opening control for doors 2R,2F to the door opening mechanism 50.

The door opening mechanism 50 then causes doors 2R and 2F to pivot about their respective rotation axes, so as to move from their closed position to their open position (step e)(see FIGS. 1-3). During this rotation, the lower seat portion 32 and the passenger seated thereon pivot, while remaining in a constant position relative to door 2R.

Once door 2R has reached the open position, the door opening mechanism 50 sends an equipment lowering control for seat lower portion 32 to the seat positioning mechanism 60.

Accordingly, after door 2R has reached its open position (that is, only when its opening movement is completed), the equipment positioning mechanism 60 moves the lower seat portion 32 downward relative to the door 2R (step f).

Please note that in other embodiments, the opening movement of doors 2R,2F (step e) and the lowering movement of seat lower portion 32 (step f) may take place simultaneously or partly simultaneously.

At the end of the lowering movement of the seat lower portion 32, the lower end thereof (the bottom surface of footrest 38) is placed at a small distance above the ground.

The passenger is therefore in a favorable position to get up: He or she can then get up and get out of shuttle 100 (step g). A vertical handle is fastened to the inner side of door 2R to help the passenger getting up.

Please note that the lowering movement of the seat lower portion 32 need not to be a vertical movement (nor even a linear movement). More generally, in a vehicle according to the present disclosure, the movement of the piece of equipment relative to the door can be actually any type of movement. The essential constraint is that the movement of the piece of equipment relative to the door place the piece of equipment in a desired position, in the open position.

In this purpose, as a minimum requirement, in the open position at least part of the piece of equipment is outside the body of the vehicle.

The same steps take place, in reverse order and reverse directions, when the passenger wants to enter in shuttle 100 and to sit down on seat 3R.

In this embodiment, when the door 2R is closed, the lower seat portion 32 rests on the floor 46 of body 1, which reduces the stress of the parts fastened to door 2R which support the lower seat portion 32 when the door 2R is being opened or is open. This is a reason why the lower seat portion 32 is slightly raised before being pivoted with door 2R.

In another embodiment, the lower seat portion does not rest at any time on the floor 46, and remains constantly hanged on door 2R, at some distance above floor 46, being only supported by door 2R.

Second Embodiment—Wheelchair-Carrying Shuttle

Figure 4:
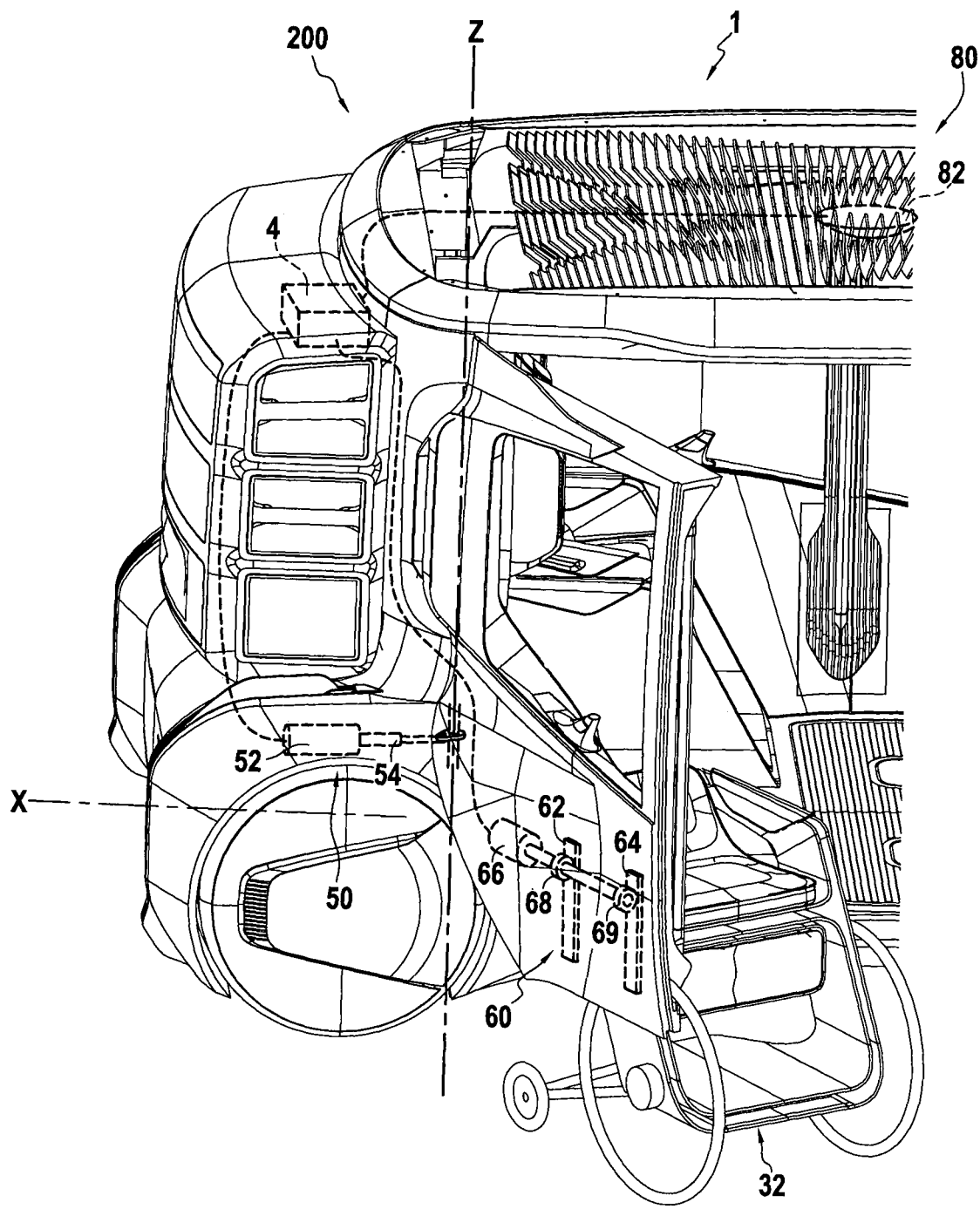
FIG. 4 is a schematic drawing in perspective of part of a second vehicle according to the present disclosure, the doors being open, a wheelchair mounted on the right rear door being lowered.

A shuttle 200 according to a second embodiment of the present disclosure will now be presented in relation with FIG. 4.

Shuttle 200 of the second embodiment is mostly identical to shuttle 100 of the first embodiment. The main difference is that the lower seat portion 32 is replaced by a wheelchair 232. Wheelchair 232 is equipped with (not-shown) hooks with which it is fastened on the sliding racks of the seat positioning mechanism 60.

When door 2R on which the wheelchair 232 is mounted is opened, the wheelchair pivots simultaneously with door 2R.

Then, the seat positioning mechanism 60 lowers the wheelchair 232.

At the end of this lowering movement, the wheels of the wheelchair are brought in contact with the ground.

The hooks are then disengaged by the passenger when he or she is ready to move the wheelchair away from shuttle 200.

Third Embodiment—Cabinet Carrying Shuttle

Figure 5:
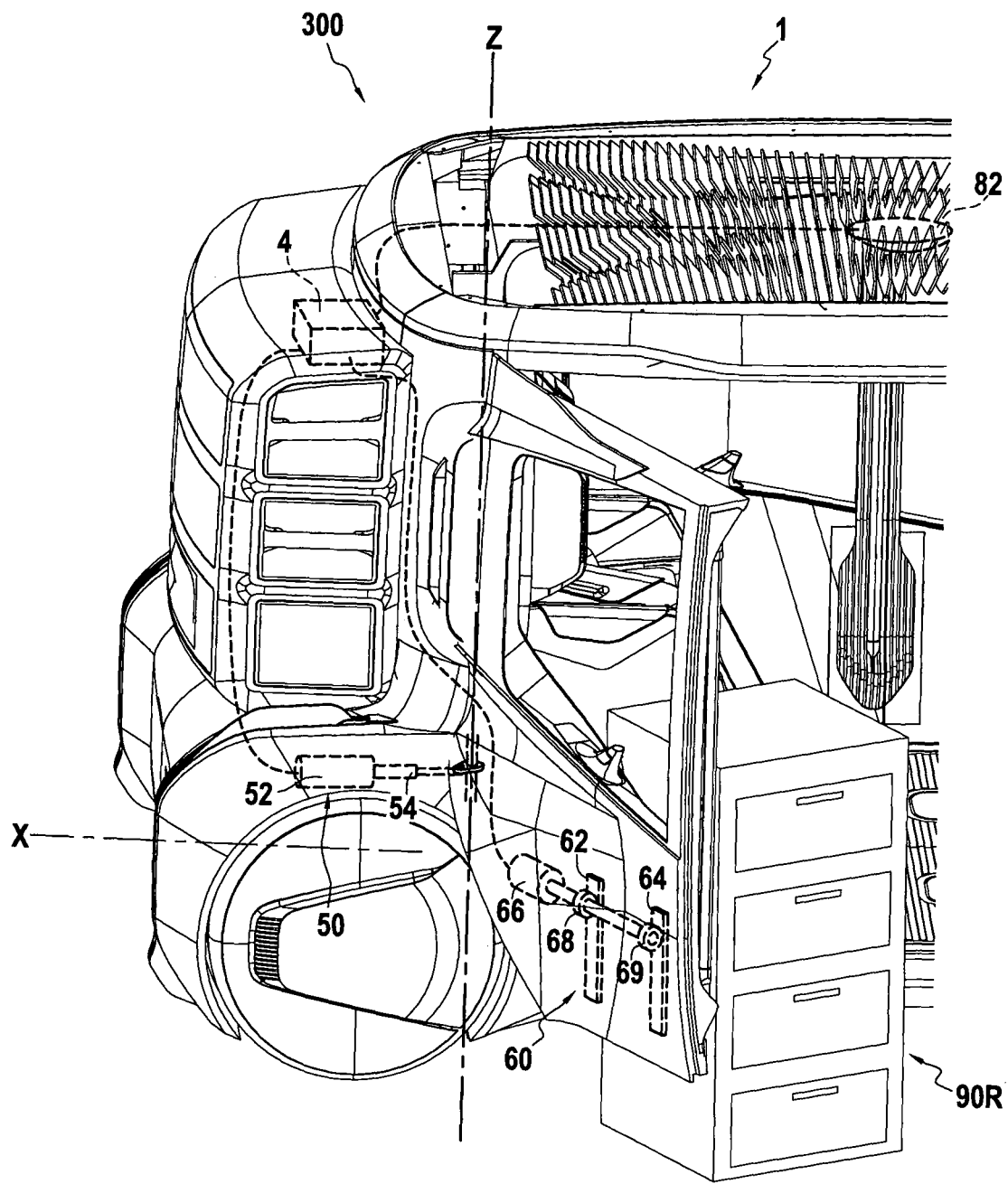
FIG. 5 is a schematic drawing in perspective of part of a third vehicle according to the present disclosure, the doors being open, a cabinet mounted on the right rear door being lowered.

Another exemplary embodiment of the present disclosure is now going to be presented in relation with FIG. 5.

Shuttle 300 of the third embodiment is mostly identical to shuttle 100 of the first embodiment. Its components are identical to those of vehicle 100 except that instead of a seat 3R, shuttle 300 contains a cabinet 90 containing medical equipment for emergency interventions.

The cabinet has three compartments (three boxes in the meaning of the present disclosure).

Like the seat lower portion 32, the cabinet 90R is mounted on the inner side of door 2R; and more precisely, on the racks 62, 64 of the equipment positioning mechanism.

The cabinet 90R is deployed out of shuttle 300 quite in the same manner as the lower seat portion 32 is deployed.

That is, during an emergency intervention, once shuttle 300 has arrived on site, doors 2R, 2F are opened. A (not shown) cabinet 90F similar to cabinet 90R is mounted on the inner side of door 2F. When doors 2F,2R are opened, the cabinets 90R and 90F are placed in utilization position.

In this purpose, while doors 2F, 2R would pivot of only 60° in passenger shuttle 100 of the first and second embodiments, doors 2R and 2F of the third embodiment pivot of almost 90°. This arrangement makes it possible to have the front faces of cabinets 90R and 90F almost facing the side of shuttle 100, in the open position.

Once doors 2F,2R have reached the open position, the cabinets 90F and 90R are lowered so as to reach the most convenient height for the intervention personal.

In an embodiment, cabinets 90F and 90R can be detached from shuttle 300, and have castor wheels, whereby they can be rolled inside a building so as to be closer to the site of the intervention.

In an embodiment, as a piece of equipment, instead of having a seat 3R, or medical cabinets 90F and 90R, the piece of equipment may be a delivery robot. It may be for instance a delivery robot, capable of dropping parcels directly in a mailbox of a building.

Although the disclosure has been presented in the case of a road shuttle, the vehicle as per the present disclosure may be any type of vehicle. It can be for example a sedan, a truck, a pick-up truck, etc. The vehicle may have or not driver-assistance functions, or autonomous driving functions. The vehicle can be a road vehicle, but it may also be a vehicle designed for rail transport, or for air transport, for instance a vertical take-off and landing vehicle (VTOL vehicle), etc.

The invention claimed is:

1. A vehicle having a body, the body comprising a door movable between a closed position and an open position of the door; wherein
a piece of equipment is mounted at an inner side of the door in such a manner that when the door opens, said piece of equipment moves to take up an open position in which at least part of said piece of equipment is outside the body of the vehicle;
said piece of equipment comprises one of a seat cushion, a plurality of shelves, and a box;
the vehicle further comprises an equipment positioning mechanism configured to move said piece of equipment downward and/or upward relative to the door, said equipment positioning mechanism moving said piece of equipment downward when the door is open; and
the vehicle further comprises a posture detection system, capable of detecting a body position of passenger(s) of the vehicle, and to prohibit opening of the door if it is detected that a position of said passenger(s) prevents safe opening of the door.

2. The vehicle according to claim 1, wherein when the door is in the closed position, said piece of equipment rests at least partially on the body or a support fastened to the body.

3. The vehicle according to claim 1, wherein when the door is in the closed position, said piece of equipment is only supported by the door.

4. The vehicle according to claim 1, wherein said piece of equipment comprises the seat cushion and a footrest.

5. The vehicle according to claim 1, wherein the piece of equipment comprises the seat cushion and a leg protection plate, arranged so that legs of a passenger seated in a chair are placed between said door and said leg protection plate.

6. The vehicle according to claim 1, further comprising a vital signs monitoring system, configured to acquire vital signs of a passenger seated on a seat.

7. The vehicle according to claim 1, wherein said piece of equipment is configured to be separated from the door once the door has reached the open position of the door.

8. The vehicle according to claim 1, wherein said piece of equipment is a wheelchair.

* * * * *